United States Patent [19]

Ito et al.

[11] Patent Number: 4,668,569

[45] Date of Patent: May 26, 1987

[54] MATTE FILM

[75] Inventors: Kojiro Ito, Kusatsu; Kunio Murakami, Uji; Minoru Kishida, Soraku; Takehiko Shimomura, Uji, all of Japan

[73] Assignee: Unitika Ltd., Amagasaki, Japan

[21] Appl. No.: 800,157

[22] Filed: Nov. 20, 1985

[30] Foreign Application Priority Data

Nov. 20, 1984 [JP] Japan ................................ 59-246884
Sep. 12, 1985 [JP] Japan ................................ 60-202912

[51] Int. Cl.$^4$ ........................ B32B 5/16; B32B 27/08; B32B 27/36

[52] U.S. Cl. .................................... 428/323; 428/324; 428/328; 428/329; 428/480; 524/140; 525/132; 525/133

[58] Field of Search ............... 525/177, 132, 148, 422, 525/444, 133; 528/176, 193, 194; 428/500, 480, 141, 195, 201, 323, 324, 328, 329; 430/59, 60, 70, 78, 72; 524/140

[56] References Cited

U.S. PATENT DOCUMENTS 4,289,870 9/1981 Donohue et al. .................... 528/193
4,584,335 4/1986 Parker ................................. 525/177

FOREIGN PATENT DOCUMENTS 0021980 1/1981 European Pat. Off. ............ 525/133
979630 1/1965 United Kingdom ................ 428/500

*Primary Examiner*—Thomas J. Herbert
*Attorney, Agent, or Firm*—Oblon, Fisher, Spivak, McClelland & Maier

[57] ABSTRACT

A matte film made of a composition comprising (a) from 3 to 20 parts by weight of a polyarylate resin made of terephthalic acid, isophthalic acid (the molar ratio of the terephthalic acid group to the isophthalic acid group being from 9:1 to 1:9) and a bivalent phenolic compound, (b) from 60 to 94 parts by weight of a linear polyester resin and (c) from 3 to 30 parts by weight of a styrene resin or an acrylic resin, and satisfying the following condition:

$$A - 10 \leq S \leq A + 15$$

where A is the parts by weight of the polyarylate resin and S is the parts by weight of the styrene resin or acrylic resin, and said film being stretched at least 1.5 times in at least one direction.

21 Claims, No Drawings

MATTE FILM

The present invention relates to matte films made of a composition comprising a polyarylate resin, a polyester resin and a styrene resin or an acrylic resin, which are useful for matte films for drawings, leader tapes for magnetic tapes, labels, wall papers or synthetic papers.

For matte-finishing or roughening a film surface, it is common to employ a so-called sand blasting method in which hard sand particles, etc. are blown to the film surface to roughen it, a coating method wherein a resin containing inorganic particles, etc. is coated on a film surface, a method wherein inorganic particles such as $SiO_2$ or $TiO_2$ particles are preliminarily incorporated into the resin for the film, or a chemical etching method in which the film surface is eroded by an acid or solvent. The matte-finishing of polyester films is most commonly carried out by the sand blasting method or the coating method. On the other hand, a study is being made to obtain a matte finish surface by an addition of an organic synthetic resin. For instance, Japanese Examined Patent Publication No. 12368/1980 discloses a combination of a linear polyester resin with a polycarbonate and at least two other polymers, and Japanese Examined Patent Publication No. 28096/1983 discloses a combination of a linear polyester resin with a phenoxy resin. Further, Japanese Examined Patent Publication No. 28097/1983 discloses a combination of a linear polyester resin with a polyarylate resin. However, in these cases, it is required to incorporate a great amount of the additional resin in order to accomplish the matte finish, whereby the costs will be high and there will be a drawback that the surface irregularities are too rough. Yet, it is hardly possible to obtain a film having good mechanical properties, and accordingly, such proposals have not yet been practically employed. As another prior art, Japanese Examined Patent Publication No. 2016/1974 discloses a process for producing a pearl-like film by incorporating a polystyrene to a polyester. However, the disclosed process is different from the present invention in the construction, object and effects.

The present inventors have conducted extensive studies on such problems, and finally arrived at the present invention.

Namely, the present invention provides a matte film made of a composition comprising (a) from 3 to 20 parts by weight of a polyarylate resin made of terephthalic acid, isophthalic acid (the molar ratio of the terephthalic acid group to the isophthalic acid group being from 9:1 to 1:9) and a bivalent phenolic compound, (b) from 60 to 94 parts by weight of a linear polyester resin and (c) from 3 to 30 parts by weight of a styrene resin or an acrylic resin, and satisfying the following condition:

$$A - 10 \leq S \leq A + 15$$

where A is the parts by weight of the polyarylate resin and S is the parts by weight of the styrene resin or acrylic resin, and said film being stretched at least 1.5 times in at least one direction.

Now, the present invention will be described in detail with reference to the preferred embodiments.

The polyarylate resin used in the present invention, is a copolymer polyester made of terephthalic acid, isophthalic acid and a bisphenol. As a method for its preparation, there may be mentioned a method in which dichlorides of terephthalic acid and isophthalic acid dissolved in a water-insoluble organic solvent are polymerized with a bisphenol dissolved in an aqueous alkaline solution by interfacial polymerization, a method in which dichlorides of terephthalic acid and isophthalic acid are polymerized with a bisphenol in an organic solvent, a method in which terephthalic acid, isophthalic acid and a bisphenol are subjected to heat-melt polymerization in the presence of acetic anhydride, a method in which phenylesters of terephthalic acid and isophthalic acid and a bisphenol are subjected to heat-melt polymerization, or a method in which terephthalic acid and isophthalic acid and a bisphenol are subjected to heat-melt polymerization in the presence of a diallyl carbonate. However, its preparation is not restricted to these specific methods.

Further, it is possible to improve the matte finish and antistatic properties by introducing from 1 to 50 mol eq/ton of acid anhydride groups in the molecular chain of the polyarylate resin. The improvement in the matte finish is believed to be attributable to the fact that the acid anhydride groups hinder the compatibility with the linear polyester. Likewise, the improvement of the antistatic properties is believed to be attributable to the fact that the copolymer polyarylate resin having acid anhydride groups is charged positively, while the linear polyester resin is charged negatively, and by the proper combination and arrangement of such two different types of resins, the positive and negative charges cancel out each other to present apparent antistatic properties. From the study of the electric charge in the case of such a combination, it has been found that the quantity of the electric charge varies depending upon the ratio of the copolymer polyarylate to the linear polyester resin and the state of the blend thereof.

The state of the blend varies depending upon the amount of acid anhydride groups in the polyarylate, and as shown in the examples, it has been found that the electric charge remarkably decreases when the amount of the acid anhydride groups is within a proper range of from 1 to 50 mol eq/ton.

The present inventors have conducted extensive researches to obtain such a proper condition constantly, and have found that good results can be obtained by melt-mixing under the following conditions.

Namely, it has been found that a matte film having improved antistatic properties can be obtained by incorporating from 0.001 to 5% by weight, based on the above-mentioned composition, of a phosphorus compound having the formula:

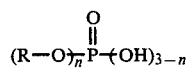

where n is an integer of 1 to 3, and R is a $C_1$-$C_{10}$ alkyl group in which a hydrogen atom may be unsubstituted or substituted by a halogen atom or a hydrocarbon group, followed by melt-mixing. As such a phosphorus compound, preferred is:

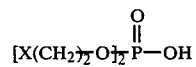

wherein X is the same or different halogen atoms;

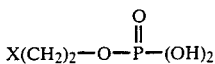

wherein X is a halogen atom; a mixture of

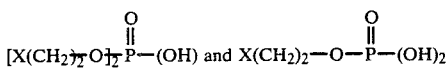

wherein X is the same or different halogen atoms;

wherein X is the same or different halogen atoms;

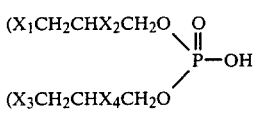

wherein $X_1$, $X_2$, $X_3$ and $X_4$ are the same or different halogen atoms; or

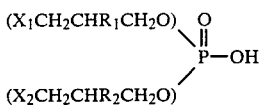

wherein $X_1$ and $X_2$ are the same or different halogen atoms, and $R_1$ and $R_2$ are the same or different hydrocarbons.

However, the phosphorus compound is not limited to these preferred exmaples.

The quantity of acid anhydride groups can be measured by the peak value of the infrared absorption spectrum at 1820 and 1760 cm$^{-1}$.

The frictional static charge in the present invention is the electric charge caused by friction of a film with itself by means of Kyodai Kaken Model Rotary Static Tester at 20° C. under a relative humidity of 40%. If the value exceeds 1000 V, troubles attributable to the electric charge are likely to be caused, such being undesirable from the practical point of view.

The linear polyester resin in the present invention is a polycondensation product of an acid component such as terephthalic acid, isophthalic acid or paraoxybenzoic acid with a diol component such as ethylene glycol or tetramethylene glycol, or it may be a mixture of at least two different kinds. As typical examples, there may be mentioned polyethylene terephthalate, and polybutylene terephthalate, which are satisfactory from the viewpoints of both the properties and costs.

Further, it is within the scope of the present invention to incorporate a cross-linking agent or to provide cross-linkable branches, and to conduct cross-linking by heat, light or radiation prior to or after the stretching.

The styrene resin in the present invention, is a resin containing at least 50 mol % of a styrene group in the molecular chain. For instance, there may be mentioned a polystyrene resin, an acrylonitrile-styrene copolymer resin, an acrylonitrile-butadiene-styrene copolymer resin, a styrene-butadiene copolymer resin, a styrene-methylmethacrylate resin, or a mixture thereof. However, the styrene resin is not restricted to these specific examples.

The acrylic resin in the present invention is a resin containing at least 50 mol % of an acrylate or methacrylate in the molecular chain. For instance, there may be mentioned a methyl methacrylate resin, an ethyl methacrylate resin, a butyl methacrylate resin, or a mixture thereof. However, the acrylic resin is not restricted to these specific examples.

With respect to the proportions of the three components of the composition, the suitable ranges are such that the polyarylate resin is from 3 to 20 parts by weight, preferably from 5 to 15 parts by weight, the linear polyester resin is from 60 to 94 parts by weight, preferably from 70 to 90 parts by weight, and the styrene resin or the acrylic resin is from 3 to 30 parts by weight, preferably from 5 to 20 parts by weight. If the ratio of the polyarylate resin to the styrene resin or acrylic resin is unbalanced to a large extent, it is difficult to obtain a uniform matte surface, or the mechanical properties will be inadequate. In the present invention, the styrene resin or the acrylic resin forms fine irregularities on the film surface and thus serves to fill the spaces between rough irregularties formed by the polyarylate resin, whereby it is possible to obtain a matte film having overall uniform irregularities. If the polyarylate resin is used alone, only a film having large irregularities is obtainable, which has a drawback that when used as a matte film for drawings, the writability is poor. Whereas, according to the present invention, the styrene resin or the acrylic resin precipitates as smaller particles than the polyarylate resin, and a film having a uniform matte surface properties is obtainable.

Further, the acrylic resin has a refractive index which is substantially different from other resins, and thus has an effect for whitening, whereby the resulting film looks as white as a paper.

Moreover, the mechanical properties can be improved by the incorporation of the styrene resin or the acrylic resin. This is considered attributable to the function of the styrene resin or the acrylic resin as a binder for the polyarylate resin and the linear polyester resin. The amount of the styrene resin or the acrylic resin is within the range to satisfy the above-mentioned formula. If the amount is outside the range, the above-mentioned synergistic effects can not be obtained, and no practically useful film will be obtained.

Further, inorganic additives such as $TiO_2$ or $SiO_2$ may be incorporated in the film of the present invention. The amount of an inorganic additive is preferably within a range of from 0.3 to 7 parts by weight. If the amount is less than this range, no adequate effect of the incorporation will be obtained. On the other hand, if the amount exceeds 7 parts by weight, there will be no substantial difference from the conventional inorganic-type matte films, and the features of the present invention will be lost. Besides, the transparency will be poor. The average particle size of the inorganic particles is preferably within a range of from 0.01 to 30 μm. The inorganic particles are preferably made of $SiO_2$, $TiO_2$, $CaCO_3$, $BaSO_4$, $Ba_2TiO_4$, $Al_2O_3$, kaolin, mica or talc. However, the material of the inorganic particles is not restricted to these specific examples. These inorganic particles are harder than the organic resins, and thus serves to improve the writing properties, particularly the writing properties by a hard pencil having a hardness of at least 3H.

The compound of the present invention has a relatively smooth surface of a non-stretched state. When stretched, however, irregularities will form. The stretching rate is at least 1.5 times, preferably at least 2 times, in at least one direction, when the resulting film is to be used as a matte film. It is possible to obtain a better film by biaxial stretching in both the longitudinal and transverse direction. In this case, it is also preferred that the biaxial stretching is conducted at a stretching rate of at least 1.5 times in each direction.

The film of the present invention may be of a single layer structure. However, it may be made to have a multi layer structure in order to obtain higher strength or to attain lower costs. Namely, a layer of the compound of the present invention may be formed on one side or each side of a linear polyester resin film, which is then stretched at least 1.5 times in at least one direction. In this case, the mechanical properties are maintained by the linear polyester layer, and yet the product is inexpensive since the compound of the present invention is used only for the surface layer. Further, since the matte surface is provided only on the required side, the transparency can be improved over the single layer film.

There is no particular restriction in the manner for the stretching of the film, and monoaxial stretching, successive biaxial stretching, simultaneous biaxial stretching, etc. may be employed. Likewise, there is no particular restriction with respect to the stretching machine, and a two roll-type monoaxial stretching machine, a tenter type transverse stretching machine, a tenter type or tubular type simultaneous biaxial stretching machine may be employed.

The film is stretched preferably at a temperature higher than the usual stretching temperature for a linear polyester resin film to obtain a good matte surface. More specifically, the stretching temperature is preferably from 90° to 125° C.

When the matte film of the present invention is used as a shrink film, no heat-setting is conducted after the stretching operation. Whereas, when the film is to be used for an application where the dimensional stability is required as in the case of a film for drawings, the heat-setting is necessary. The heat-setting temperature is preferably within a range of from 60° C. below the melting point of the linear polyester resin to the melting point of the linear polyester resin.

Now, the present invention will be described in further detail with reference to Examples. However, it should be understood that the present invention is by no means restricted by these specific Examples.

EXAMPLES 1 TO 8 AND COMPARATIVE EXAMPLES 1 TO 7

A polyarylate resin was prepared by the interfacial polymerization of a methylene chloride solution of mixed acid chlorides, i.e. terephthalic acid dichloride/isophthalic acid dichloride at a ratio of 5:5, with bisphenol A dissolved in an aqueous alkaline solution. The polyarylate resin, a polyethylene terephthalate resin and a polystyrene resin were mixed in various ratios, and the mixture was heated, mixed and formed into chips by a double-screw extruder. Then, the chips were melted at 280° C. by a 50 mm extruder and extruded from a T-die to obtain a film having a thickness of about 150 μm. The film was monoaxially stretched 2 times at 90° by a double-roll type monoaxial stretching machine. The writing properties of the stretched film were evaluated. The results are shown in Table 1.

TABLE 1

|  | Polyarylate (parts by weight) | Polyethylene terephthalate (parts by weight) | Polystyrene (parts by weight) | Mechanical properties | Writing properties | Overall evaluation |
| --- | --- | --- | --- | --- | --- | --- |
| Comparative Example 1 | 3 | 97 | 0 | Good | No good | Unsatisfactory |
| Comparative Example 2 | 5 | 95 | 0 | Good | No good | Unsatisfactory |
| Example 1 | 3 | 94 | 3 | Good | Fair | Satisfactory |
| Example 2 | 5 | 85 | 10 | Good | Good | Satisfactory |
| Comparative Example 3 | 5 | 75 | 25 | No good | Good | Unsatisfactory |
| Comparative Example 4 | 10 | 90 | 0 | No good | No good | Unsatisfactory |
| Example 3 | 10 | 85 | 5 | Good | Good | Satisfactory |
| Example 4 | 10 | 80 | 10 | Good | Good | Satisfactory |
| Example 5 | 10 | 75 | 15 | Good | Good | Satisfactory |
| Example 6 | 10 | 70 | 20 | Good | Good | Satisfactory |
| Comparative Example 5 | 10 | 65 | 30 | No good | No good | Unsatisfactory |
| Comparative Example 6 | 15 | 85 | 0 | No good | Good | Unsatisfactory |
| Comparative Example 7 | 15 | 80 | 3 | No good | Good | Unsatisfactory |
| Example 7 | 15 | 75 | 10 | Good | Good | Satisfactory |
| Example 8 | 15 | 65 | 20 | Fair | Fair | Satisfactory |

EXAMPLE 9

A non-stretched film of a three component composition was prepared in the same manner as in Example 4 except that the polystyrene resin was replaced by a copolymer resin of acrylonitrile and styrene at a molar ratio of 4:6. The film was simultaneously biaxially stretched at 100° C. at a longitudinal-transverse stretching rate of 3.3×3.3 times by a test stretching machine, and heat-set at 230° C. The biaxially stretched film thereby obtained was tested for the writing properties, the erasure and rewriting properties and the reproducibility, whereby good results were obtained with both a pencil and an ink. Further, the mechanical properties of the film were satisfactory as shown in Table 2.

TABLE 2

| Test item | Unit | Value |
| --- | --- | --- |
| Breaking strength | kg/mm² | 18.3 |
| Breaking elongation | % | 102 |

TABLE 2-continued

| Test item | Unit | Value |
| --- | --- | --- |
| Young's modulus | kg/mm² | 403 |
| Heat shrinkage (160° C., 15 min) | % | 1.9 |

(Measured in the longitudinal direction of the film)

EXAMPLE 10

By using a co-extrusion film-forming machine equipped with three 40 mm extruders, a non-stretched film comprising a center polyethylene terephthalate layer of 300 μm and a mixed resin layer of 100 μm having the same composition as in Example 4 on each side of the polyethylene terephthalate layer, was prepared. This non-stretched film was stretched 3.3 times in the longitudinal direction at 90° C. by a roll type longitudinal stretching machine and then 3.4 times in the transverse direciton at 100° C. by a tenter-type stretching machine, and then immediately heat-set at 230° C.

The stretched film had a large surface roughness as shown in Table 3 and good writing properties. Further, the mechanical properties were good as shown in Table 3.

TABLE 3

| Test item | Unit | Value |
| --- | --- | --- |
| Surface roughness | | |
| SRm | μm | 7.15 |
| SRa | μm | 0.85 |
| Breaking strength | kg/mm² | 21.0 |
| Breaking elongation | % | 115 |
| Young's modulus | kg/mm² | 440 |
| Heat shrinkage (160° C., 15 min) | % | 1.5 |

(Measured in the longitudinal direction of the film)

EXAMPLES 11 TO 18 AND COMPARATIVE EXAMPLES 8 TO 14

A polyarylate resin was prepared by the interfacial polymerization of a methylene chloride solution of mixed acid chlorides i.e. terephthalic acid dichloride/isophthalic acid dichloride at a ratio of 5:5, with bisphenol A dissolved in an aqueous alkaline solution. The polyarylate resin, a polyethylene terephthalate resin and a polymethyl methacrylate resin were mixed in various ratios, and the mixture was heated, mixed and formed into chips by a double-screw extruder. Then, the chips were melted at 280° C. by a 50 mm extruder, and extruded from a T-die to obtain a film having a thickness of about 500 μm. The film was monoaxially stretched 2 times at 95° C. by a two-roll type monoaxial stretching machine. The stretched film thereby obtained was tested for the writing properties. The results are shown in Table 4.

TABLE 4

| | Polyarylate (parts by weight) | Polyethylene terephthalate (parts by weight) | Polymethyl methacrylate (parts by weight) | Mechanical properties | Writing properties | Overall evaluation |
| --- | --- | --- | --- | --- | --- | --- |
| Comparative Example 8 | 3 | 97 | 0 | Good | No good | Unsatisfactory |
| Comparative Example 9 | 5 | 95 | 0 | Good | No good | Unsatisfactory |
| Example 11 | 3 | 94 | 3 | Good | Fair | Satisfactory |
| Example 12 | 5 | 85 | 10 | Good | Good | Satisfactory |
| Comparative Example 10 | 5 | 75 | 25 | No good | Good | Unsatisfactory |
| Comparative Example 11 | 10 | 90 | 0 | No good | No good | Unsatisfactory |
| Example 13 | 10 | 85 | 5 | Good | Good | Satisfactory |
| Example 14 | 10 | 80 | 10 | Good | Good | Satisfactory |
| Example 15 | 10 | 75 | 15 | Good | Good | Satisfactory |
| Example 16 | 10 | 70 | 20 | Good | Good | Satisfactory |
| Comparative Example 12 | 10 | 65 | 30 | No good | No good | Unsatisfactory |
| Comparative Example 13 | 15 | 85 | 0 | No good | Good | Unsatisfactory |
| Comparative Example 14 | 15 | 80 | 3 | No good | Good | Unsatisfactory |
| Example 17 | 15 | 75 | 10 | Good | Good | Satisfactory |
| Example 18 | 15 | 65 | 20 | Fair | Fair | Satisfactory |

EXAMPLE 19

A non-stretched film of a three component composition was prepared in the same manner as in Example 14. The film was simultaneously biaxially stretched at 100° C. at a longitudinal-transverse stretching rate of 3.3×3.3 times by a test stretching machine, and heat-set at 230° C. The biaxially stretched film thereby obtained was tested for the writing properties, the erasure and rewriting properties and the reproducibility, whereby good results were obtained with both a pencil and an ink. Further, the mechanical properties of the film were satisfactory as shown in Table 5.

TABLE 5

| Test item | Unit | Value |
| --- | --- | --- |
| Breaking strength | kg/mm² | 18.0 |
| Breaking elongation | % | 111 |
| Young's modulus | kg/mm² | 415 |
| Heat shrinkage (160° C., 15 min) | % | 1.7 |

(Measured in the longitudinal direction of the film)

EXAMPLE 20

By using a co-extrusion film-forming machine equipped with three 40 mm extruders, a non-stretched film comprising a center polyethylene terephthalate layer of 300 μm and a mixed resin layer of 100 μm having the same composition as in Example 14 on each side of the polyethylene terephthalate layer, was prepared. This non-stretched film was stretched 3.3 times in the longitudinal direction at 90° C. by a roll type longitudinal stretching machine and then 3.4 times in the transverse direciton at 100° C. by a tenter-type stretching machine, and then immediately heat-set at 230° C.

The stretched film had a large surface roughness as shown in Table 6 and good writing properties. Further, the mechanical properties were good as shown in Table 6.

TABLE 6

| Test item | Unit | Value |
| --- | --- | --- |
| Surface roughness | | |
| SRm | $\mu$m | 8.34 |
| SRa | $\mu$m | 0.73 |
| Breaking strength | kg/mm$^2$ | 20.3 |
| Breaking elongation | % | 123 |
| Young's modulus | kg/mm$^2$ | 430 |
| Heat shrinkage (160° C., 15 min) | % | 1.3 |

(Measured in the longitudinal direction of the film)

EXAMPLES 21 TO 26 AND COMPARATIVE EXAMPLES 15 AND 16

A polyarylate resin was prepared by the interfacial polymerization of a methylene chloride solution of mixed acid chlorides, i.e. terephthalic acid dichloride/isophthalic acid dichloride at a ratio of 5:5, with bisphenol A dissolved in an aqueous alkaline solution. The polyarylate resin, a polymethyl methacrylate resin, a polyethylene terephthalate resin and a silica powder having an average particle size of 4 $\mu$m, were mixed in various ratios, and the mixture was heated, mixed and formed into chips by a double-screw extruder. Then, these chips were melted at 280° C. by a 60 mm extruder, and extruded from a T-die. The film had a thickness of 500 $\mu$m. The non-stretched film was stretched 3.0 times in the longitudinal direction at 90° C. by a roll-type longitudinal stretching machine, and then 3.4 times in the transverse direction at 100° C. by a tenter method.

The pencil writing properties of the films thus prepared were evaluated by a 10 point system. The results are shown in Table 7.

TABLE 7

| | Composition (parts by weight) | | | | Pencil writing properties | | | | |
| --- | --- | --- | --- | --- | --- | --- | --- | --- | --- |
| | Polyarylate | Polyethylene terephthalate | Polymethyl methacrylate | Silica | HB | H | 2H | 3H | 4H |
| Comparative Example 16 | 8 | 84 | 8 | 0 | 9 | 9 | 7 | 5 | 4 |
| Comparative Example 17 | 10 | 80 | 10 | 0 | 9 | 9 | 7 | 6 | 5 |
| Example 21 | 8 | 84 | 8 | 0.5 | 10 | 9 | 9 | 8 | 7 |
| Example 22 | 8 | 84 | 8 | 2 | 10 | 10 | 9 | 8 | 7 |
| Example 23 | 8 | 84 | 8 | 5 | 10 | 10 | 10 | 9 | 8 |
| Example 24 | 10 | 80 | 10 | 0.5 | 10 | 10 | 10 | 8 | 8 |
| Example 25 | 10 | 80 | 10 | 2 | 10 | 10 | 10 | 9 | 8 |
| Example 26 | 10 | 80 | 10 | 5 | 10 | 10 | 10 | 9 | 9 |

As is evident from Table 7, the film hardness is improved by the addition of silica, whereby the writing properties particularly with a hard pencil having a hardness of at least 3H were improved remarkably.

EXAMPLE 27

The non-stretched laminated film as used in Example 22 was stretched 3.3 times in the longitudinal direction at 100° C. by a roll-type longitudinal stretching machine, and then 3.5 times in the transverse direction at 100° C. by a tenter-type transverse stretching machine, and immediately heat-set at 230° C. The biaxially stretched film thus obtained was tested for the writing properties, the erasure and rewriting properties and the reproducibility. As shown in Table 8, good results were obtained with both a pencil and an ink. Further, the mechanical properties of the film were good as shown in Table 9.

TABLE 8

| Pencil writing properties | HB | 10 |
| --- | --- | --- |
| | H | 10 |
| | 2H | 9 |
| | 3H | 9 |
| | 4H | 8 |
| Ink writing properties | | Good |
| Drawing line adhesion | | Good |
| Erasure and rewriting properties | | Good |
| Fold-line reproducibility | | Good |
| Embossing properties | | Good |
| Reproducibility | | Good |

TABLE 9

| Test item | Unit | Stretching direction | Value |
| --- | --- | --- | --- |
| Breaking strength | kg/mm$^2$ | MD* | 23.1 |
| | | TD** | 22.2 |
| Breaking elongation | % | MD | 113 |
| | | TD | 98 |
| Young's modulus | kg/mm$^2$ | MD | 410 |
| | | TD | 430 |
| Heat shrinkage (160° C., 15 min.) | % | MD | 1.3 |
| | | TD | 0.5 |

*MD: machine direction (longitudinal direction)
**TD: transverse direction

EXAMPLES 28 TO 33 AND COMPARATIVE EXAMPLES 18 TO 22

A copolymerized polyarylate containing a different number of acid anhydride groups was prepared by the interfacial polymerization of a methylene chloride solution of mixed acid chlorides, i.e. terephthalic acid dichloride/isophthalic acid dichloride at a ratio of 5:5, with bisphenol A dissolved in an aqueous alkaline solution having a different alkali concentration. The copolymerized polyarylate, polyethylene terephthalate and polymethyl methacrylate were mixed in various ratios, and the mixture was heated, mixed and formed into chips by a double-screw extruder. Then, these chips were melted at 280° C. by an extruder, and extruded from a T-die to obtain a film having a thickness of 500 $\mu$m. The film was biaxially stretched at a longitudinal-transverse stretching rate of 3×3 times, and then the frictional static charge by the frictional engagement of the film itself was measured by Kyodai Kaken Model Rotary Static Tester at a temperature of 20° C. under a relative humidity of 40%. The results are shown in Table 10.

TABLE 10

| | Acid anhydride groups (mol eq/ton) | Composition (parts by weight) | | | Frictional static charge (V) |
|---|---|---|---|---|---|
| | | Polyarylate | Polyethylene terephthalate | Polymethyl methacrylate | |
| Comparative Example 18 | — | 0 | 100 | 0 | 1600 |
| Comparative Example 19 | 0.4 | 8 | 84 | 8 | 1410 |
| Comparative Example 20 | 0.4 | 10 | 80 | 10 | 1380 |
| Example 28 | 2.1 | 8 | 84 | 8 | 910 |
| Example 29 | 2.1 | 10 | 80 | 10 | 850 |
| Example 30 | 17.4 | 8 | 84 | 8 | 610 |
| Example 31 | 17.4 | 10 | 80 | 10 | 510 |
| Example 32 | 37.4 | 8 | 84 | 8 | 720 |
| Example 33 | 37.4 | 10 | 80 | 10 | 810 |
| Comparative Example 21 | 56.2 | 8 | 84 | 8 | 1090 |
| Comparative Example 22 | 56.2 | 10 | 80 | 10 | 1120 |

EXAMPLES 34 TO 36

The copolymerized polyarylate as used in Example 30, polyethylene terephthalate and polymethyl methacrylate were blended. To this mixture, a phosphorus compound having the formula:

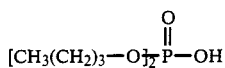

was added, and then heated, melted and chiped by a double-screw extruder. Then, these chips were melted at 280° C. by a 50 mm extruder, and extruded from T-die to obtain a film having a thickness of 150 μm. The film was biaxially stretched at a longitudinally-transverse stretching rate of 3×3 times. Then, the frictional static charge caused by the frictional engagement of the film itself was measured at 20° C. under a relative humidity of 40% by means of Kyodai Kaken Model Rotary Static Tester. The results are shown in Table 11.

TABLE 11

| | Amount of the phosphorus compound (wt. %) | Frictional static charge (V) |
|---|---|---|
| Example 34 | 0.1 | 550 |
| Example 35 | 0.5 | 380 |
| Example 36 | 2.0 | 280 |

We claim:

1. A matte film made of a composition comprising (a) from 3 to 20 parts by weight of a polyarylate resin made of terephthalic acid, isophthalic acid (the molar ratio of the terephthalic acid group to the isophthalic acid group being from 9:1 to 1:9) and a bivalent phenolic compound, (b) from 60 to 94 parts by weight of a linear polyester resin and (c) from 3 to 30 parts by weight of a styrene resin or an acrylic resin, and satisfying the following condition:

$$A - 10 \leq S \leq A + 15$$

where A is the parts by weight of the polyarylate resin and S is the parts by weight of the styrene resin or acrylic resin, and said film being stretched at least 1.5 times in at least one direction.

2. The matte film accoridng to claim 1, which further contains from 0.3 to 7 parts by weight of inorganic particles.

3. The matte film according to claim 2, wherein the inorganic particles have an average particle size of from 0.01 to 30 μm.

4. The matte film according to claim 2, wherein the inorganic particles are $SiO_2$, $TiO_2$, $CaCO_3$, $BaSO_4$, $Ba_2TiO_4$, $Al_2O_3$, kaolin, mica or talc.

5. A matte film comprising a linear polyester resin film and the composition as defined in claim 1 laminated on one side or both sides of the linear polyester resin film, and stretched at least 1.5 times in at least one direction.

6. The matte film according to claim 1, wherein the polyarylate resin is a co-polymerized polyarylate resin made of terephthalic acid, isophthalic acid (the molar ratio of the terephthalic acid group to the isophthalic acid group being from 9:1 to 1:9) and a bivalent phenolic compound, and containing from 1 to 50 mol eq/ton of acid anhydride groups in the molecular chain.

7. The matte film according to claim 1, wherein the styrene resin is a resin containing at least 50 mol % of a styrene group in the molecular chain.

8. The matte film according to claim 1, wherein the styrene resin is a polystyrene resin, an acrylonitrile-styrene copolymer resin, an acrylonitrile-butadiene-styrene copolymer resin, a styrene-butadiene copolymer resin, a styrene-methylmethacrylate resin or a mixture thereof.

9. The matte film according to claim 1, wherein the acrylic resin is a resin containing at least 50 mol % of an acrylate or methacrylate in the molecular chain.

10. The matte film according to claim 1, wherein the acrylic resin is a methyl methacrylate resin, an ethyl methacrylate resin, a butyl methacrylate resin or a mixture thereof.

11. The matte film according to claim 1, wherein the linear polyester resin is a polycondensation product or a mixture of an acid component such as terephthalic acid, isophthalic acid or paraoxybenzoic acid and a diol component such as ethylene glycol or tetramethylene glycol.

12. The matte film according to claim 1, wherein the linear polyester resin is polyethylene terephthalate or polybutylene terephthalate.

13. The matte film according to claim 1, which is biaxially stretched at least 1.5 times in each direction.

14. The matte film according to claim 1, which is stretched at a temperature of from 90° to 125° C.

15. The matte film according to claim 1, which is heat-set at a temperature within a range of from 60° C. below the melting point of the linear polyester resin to the melting point of the linear polyester resin.

16. A matte film made of a composition comprising (a) from 3 to 20 parts by weight of a polyarylate resin made of terephthalic acid, isophthalic acid (the molar ratio of terephthalic acid group to the isophthalic acid group being from 9:1 to 1:9) and a bivalent phenolic compound, (b) from 60-94 parts by weight of a linear polyester resin, (c) from 3-30 parts by weight of a styrene or an acrylic resin and (d) from 0.001 to 5% by weight, based on the composition, of a phosphorus compound having the formula:

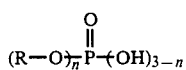

wherein n is an integer from 1 to 3 inclusive, and R is a $C_1$-$C_{10}$ alkyl group in which a hydrogen atom is unsubstituted or substituted by a halogen atom or a hydrocarbon group, and
wherein the following condition is satisfied:

$$A-10<S<A+15$$

where A is the parts by weight of the polyarylate resin and S is the parts by weight of the styrene resin or acrylic resin, and said film being stretched at least 1.5 times in at least one direction.

17. The matte film of claim 16, further comprising from 0.3 to 7 parts by weight of inorganic particles.

18. The matte film of claim 17, wherein said inorganic particles have an average particle size of from 0.01 to 30 micron.

19. The matte film of claim 17, wherein said inorganic particles are $SiO_2$, $TiO_2$, $CaCO_3$, and $BaSO_4$, $Ba_2TiO_4$, $Al_2O_3$, kaolin, mica or talc.

20. The matte film of claim 16, wherein said phosphorous compound is:

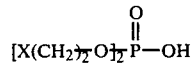

wherein X is the same or different halogen atoms;

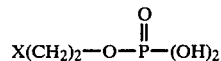

wherein X is a halogen atom; a mixture of

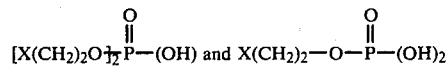

wherein X is the same or different halogen atoms;

wherein X is the same or different halogen atoms;

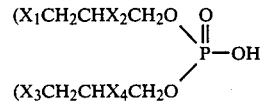

wherein $X_1$, $X_2$, $X_3$ and $X_4$ are the same or different halogen atoms; or

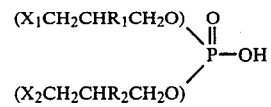

wherein $X_1$ and $X_2$ are the same or different halogen atoms, and $R_1$ and $R_2$ are the same or different hydrocarbons.

21. A matte film comprising a linear polyester resin film and the composition as defined in claim 16, wherein said linear polyester resin film is laminated on one side or both sides with said composition, and stretched at least 1.5 times in at least one direction.

* * * * *